(12) United States Patent
Gramling, III

(10) Patent No.: US 6,474,575 B1
(45) Date of Patent: Nov. 5, 2002

(54) PLASTIC CHIPPING METHOD AND APPARATUS

(76) Inventor: Andrew Copes Gramling, III, 150 Gramling Dr., Mountain Rest, SC (US) 29664

( * ) Notice: Subject to any disclaimer, the term of this patent is extended or adjusted under 35 U.S.C. 154(b) by 0 days.

(21) Appl. No.: 09/606,758

(22) Filed: Jun. 29, 2000

Related U.S. Application Data

(60) Provisional application No. 60/141,417, filed on Jun. 29, 1999.

(51) Int. Cl.[7] .............................................. B02C 18/22
(52) U.S. Cl. .............................. 241/30; 241/55; 241/92
(58) Field of Search ............................ 241/55, 92, 30

(56) References Cited

U.S. PATENT DOCUMENTS

| | | | |
|---|---|---|---|
| 3,635,410 A | | 1/1972 | Smith |
| 3,661,329 A | * | 5/1972 | Smith et al. .................. 241/92 |
| 3,844,489 A | | 10/1974 | Strong |
| 3,856,212 A | | 12/1974 | Swatko |
| 4,160,471 A | | 7/1979 | Lapointe |
| 4,390,132 A | | 6/1983 | Hutson et al. |
| 4,619,410 A | * | 10/1986 | Lenzer et al. .................. 241/55 |
| 5,020,579 A | | 6/1991 | Strong |
| 5,381,970 A | | 1/1995 | Bold et al. |
| 5,385,308 A | | 1/1995 | Gearing et al. |
| 5,477,900 A | | 12/1995 | Gray |

\* cited by examiner

*Primary Examiner*—Mark Rosenbaum
(74) *Attorney, Agent, or Firm*—Leatherwood Walker Todd & Mann, P.C.

(57) ABSTRACT

A chipping machine having an elongated, rotatable chipping member, the chipping member having at least one cutting blade and defining at least one blade opening adjacent the cutting blade. A paddle is provided on the chipping member which is associated with the blade opening and which extends radially with respect to the axis of rotation of the cutting member. The paddle preferably includes a tapered-in portion tapered inwardly toward the axis of rotation of the chipping member. A discharge chute is provided for receiving the chips cut from the article by the chipping member. The discharge chute preferably includes a generally semi-circular portion having a diameter greater than the chipping member and defines a chip path volume of generally semi-circular cross-sectional shape.

22 Claims, 5 Drawing Sheets

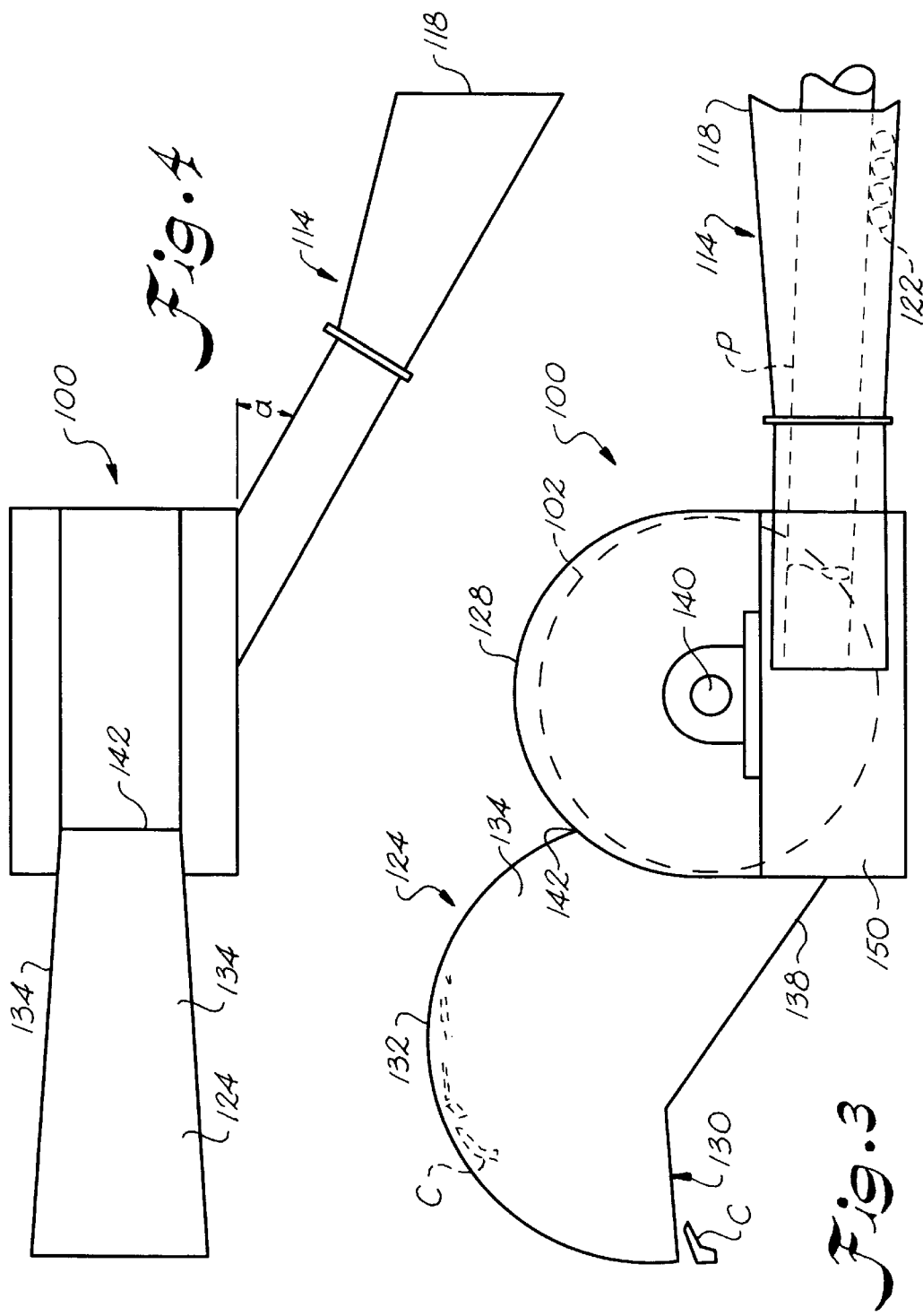

PLASTIC CHIPPING METHOD AND APPARATUS

This application claims the benefit of U.S. Provisional application Ser. No. 60/141,417, filed Jun. 29, 1999.

BACKGROUND OF THE INVENTION

This invention relates generally to a method and an apparatus for chipping large plastic items such as piping, conduit, etc.

In recycling polymeric articles such as polyethylene pipe, or other products made of polyethylene, polypropylene, nylon, polybutylene, etc., the products, once reduced to chips of manageable size, are fed into a granulator machine for grinding and subsequent reuse in molding processes, to produce new articles. A problem arises in how to reduce large polymeric articles, such as polyethylene pipe, which may be several feet in diameter, into pieces or chips small enough to be handled by the granulator machine.

The conventional method involves cutting the pipe with a band saw into manageable sections which can then be split into chips or pieces small enough to be used by the granulator. This is a labor-intensive and time-consuming process.

Devices for chipping wood products are known. For example, U.S. Pat. No. 3,856,212, issued to Swatko, discloses a wood chipper having a disc with blade portions angled towards a shaft and openings for discharging the chips through the disc. U.S. Pat. No. 3,635,410, issued to Smith, discloses a wood chipper having an intake chute at an angle with respect to a wood chipper disc.

U.S. Pat. Nos. 5,020,759 and 3,844,489, both issued to Strong, discloses rollers for supporting logs being fit into a wood chipping machine.

The foregoing known wood chipping devices, however, are not designed for chipping large plastic articles, such as polymeric, and in particular polyethylene pipe, and according, there exists a need for such a device.

SUMMARY OF THE INVENTION

It is, therefore, the principal object of this invention to provide a device for chipping polymeric articles.

Another object of the present invention is to provide a device for chipping polymeric pipe.

Yet another object of the present invention is to provide an improved chipping device which can be used to chip polymeric or wood articles.

Still another object of the present invention is to provide a method for chipping polymeric articles.

Generally, the present invention includes a chipper having an intake chute for receiving articles, and in particular polymeric pipe, the intake chute including a live roller conveyer for supporting the pipe as it is drawn into the chute. A rotating chipper disc, or blade, is provided which is driven by a diesel or gas engine, electric motor, hydraulic motor, or the like. The intake chute is disposed at an angle with respect to the chipper blade such that during operation, once the chipper blade engages the polymeric article or pipe to be chipped, such pipe or articles are pulled into the machine by the blade automatically due to the angle at which the intake chute is disposed with respect to the chipper blade. This angle may be approximately 30°. Thus, by having the pipe or other article approach the chipper blade at that angle, the pipe or other article is continually drawn into the chipper by rotation of the chipper blade.

Another feature of the present invention is the provision of a discharge chute designed for discharge of polymeric chips. The discharge chute is attached to the housing of the chipper device adjacent the chipper blade such that as plastic pipe and articles which pass through openings in the chipper blade, and which are sheared there through interaction of the opening and one or more bed knives provided in the chipper device, the chips thus created are propelled away from the chipper blade by a series of paddles carried on the backside of the chipper blade. These paddles kick the plastic chips upwardly, tangentially with respect to the chipper blade, and to the discharge chute.

The chute is designed to guide and constrain what in essence is projectile motion of the chips, meaning that the chips follow an arcuate path which is first directed upwardly, but which then curves downwardly towards the opening of the chute. This configuration of the discharge chute allows for increased throughput of plastic chips, as would be compared to a discharge chute ordinarily found in a wood chipper.

The present invention also includes a chipper disc which has modified paddles as compared to those used on a conventional wood chipping devices. The chipper disc has been modified to include paddle extensions which cause the paddles to taper inwardly towards the shaft on which the chipper blade rotates. These tapered-in portions of the paddles reduce the likelihood of one or more chips becoming jammed adjacent the backside of the chipper blade.

BRIEF DESCRIPTION OF THE DRAWINGS

The foregoing, as well as other objects of the present invention, will be further apparent from the following detailed description of the preferred embodiment of the invention, when taken together with the accompanying specification and the figures, in which:

FIG. 3 is a schematic side elevational view of a plastic chipping machine constructed in accordance with the present invention, which includes a discharge chute having an open side;

FIG. 4 is a schematic plan view of a plastic chipping machine constructed in accordance with the present invention, having a discharge chute which flares to prevent material from jamming;

DESCRIPTION OF THE PREFERRED EMBODIMENT

Figure 1:
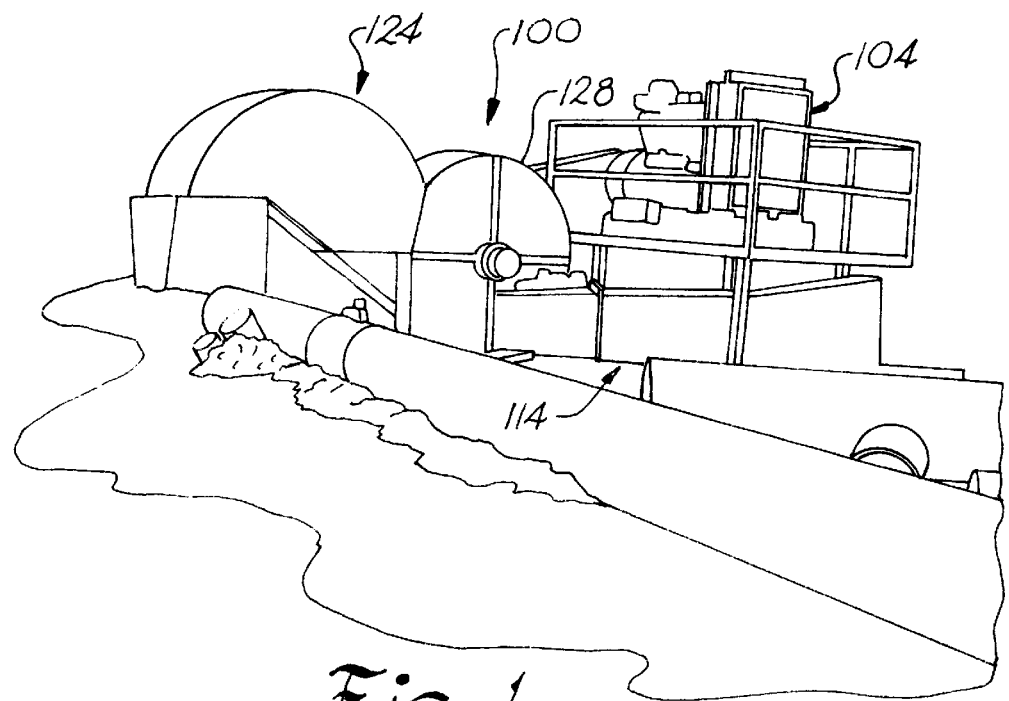
FIG. 1 is a perspective photographic view of a plastic chipping machine constructed in accordance with the present invention.

The accompanying drawings and the description which follows set forth this invention in its preferred embodiment. However, it is contemplated that persons generally familiar with wood chippers and plastic granulators will be able to apply the novel characteristics of the structures illustrated and described herein in other contexts by modification of certain details. Accordingly, the drawings and description are not to be taken as restrictive on the scope of this invention, but are to be understood as broad and general teachings.

Referring now to the drawings in detail, wherein like reference characters represent like elements or features throughout the various views, the chipper of the present invention is indicated generally in the figures by reference character 100.

Figure 7:
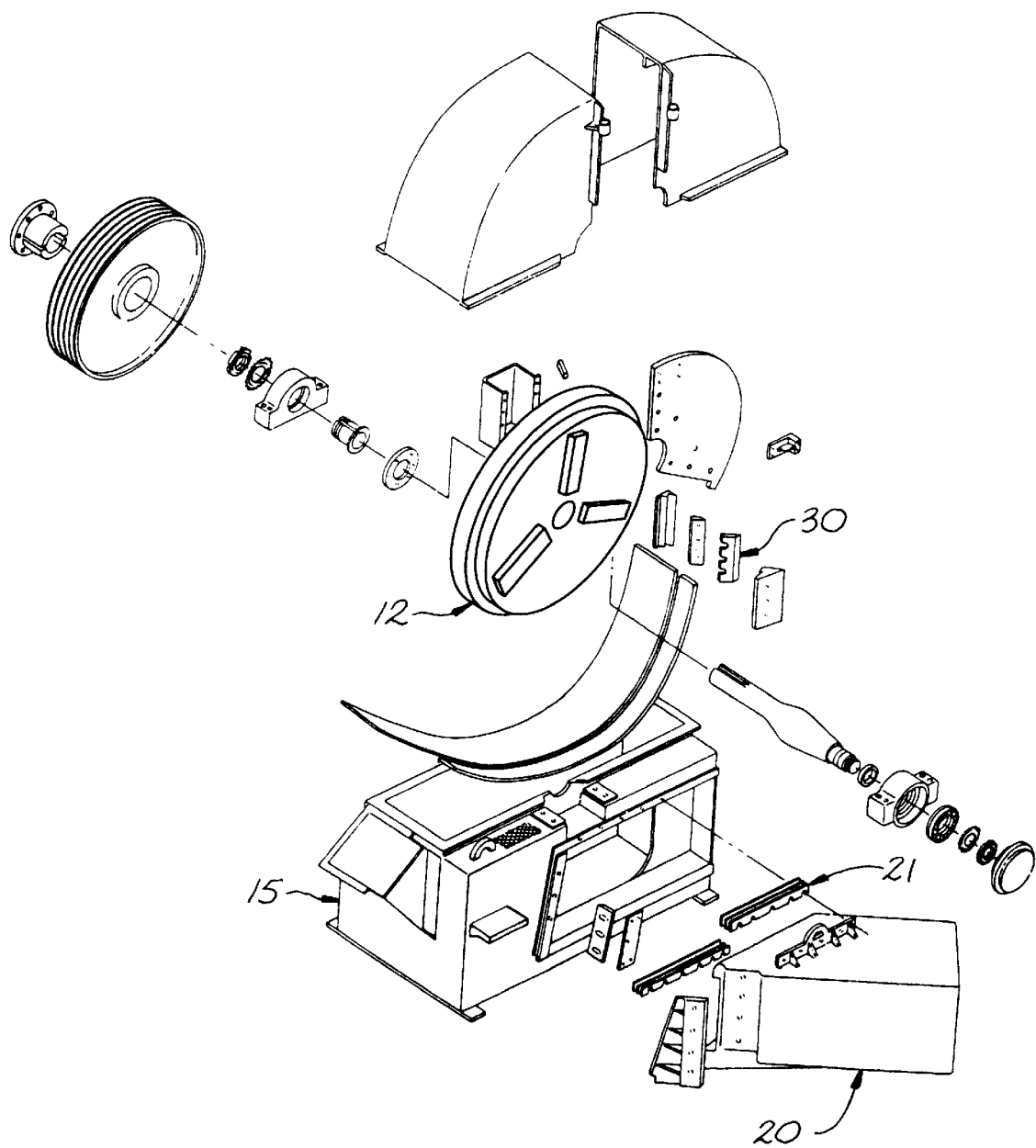
FIG. 7 is an exploded view of a prior art wood chipping machine.
Figure 8:
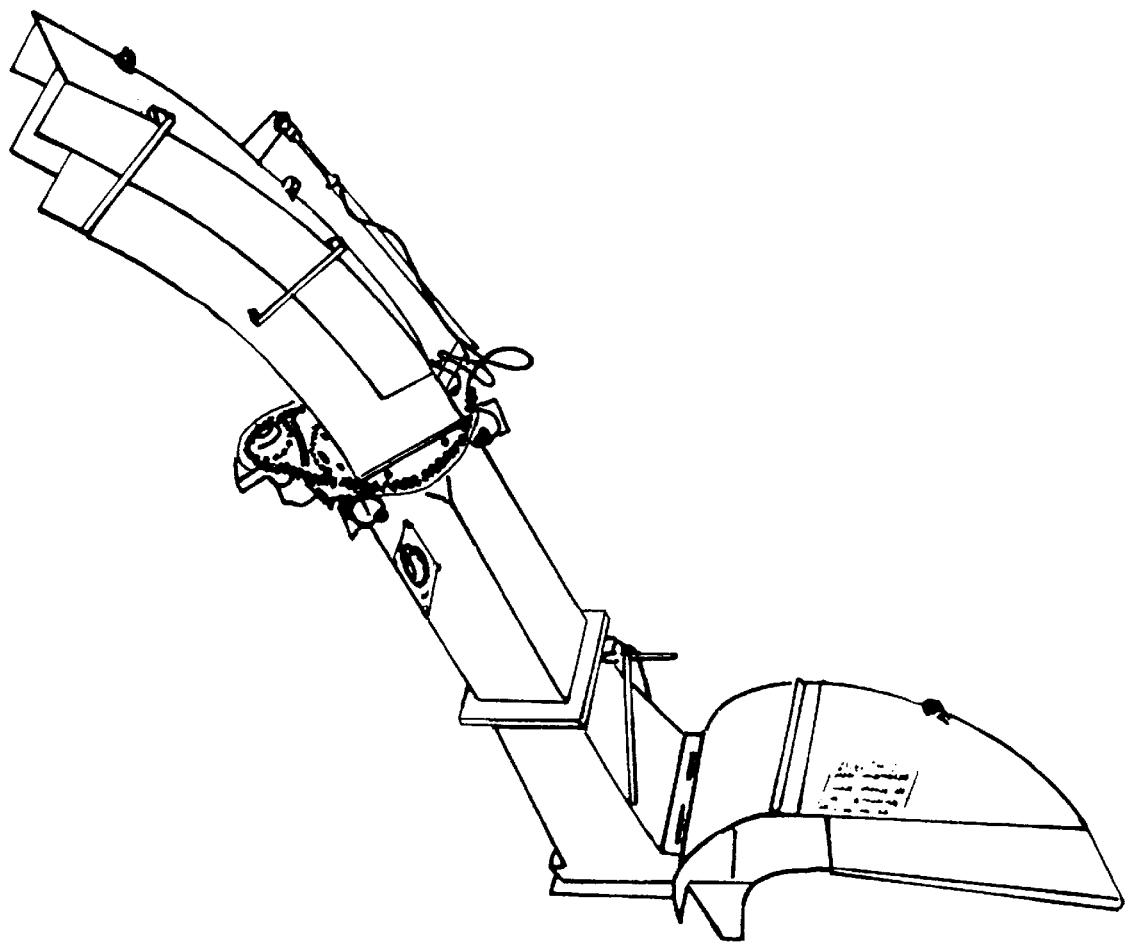
FIG. 8 is an exploded view of a prior art discharge chute for a wood chipping machine.

FIG. 1 illustrates a plastic chipping device constructed in accordance with the present invention. It should be noted at the outset that the chipping device 100 is based on a conventional, prior art wood chipper, and specifically, a 75-inch Morbark chipper manufactured by Morbark Industries, Inc., Box 1000, Winn, Mich. 48896. Further, the Morbark chipper, is illustrated in its *Operators Manual and Parts Manual*, the entire contents of both the Operators Manual and the Parts Manual being incorporated herein by reference thereto, and both manuals form a part of and are incorporated by reference in the provisional patent application first noted above, namely U.S. Provisional patent application Ser. No 60/141,417, filed Jun. 29, 1999, of which this application claims benefit. FIGS. 7 and 8 from the *Parts Manual* illustrate the basic chipping device as including an infeed spout 20, which is attached to a base 15. A three blade, or knife, chipper disc 12 is provided for chipping wood delivered to it. The wood chips pass through the chipper disc and are engaged by paddles (not shown) on the backside of the chipper disc. These chips are then kicked or propelled by the paddles outwardly through a discharge spout assembly such as shown on page 6 of the Morbark parts manual.

Figure 2:
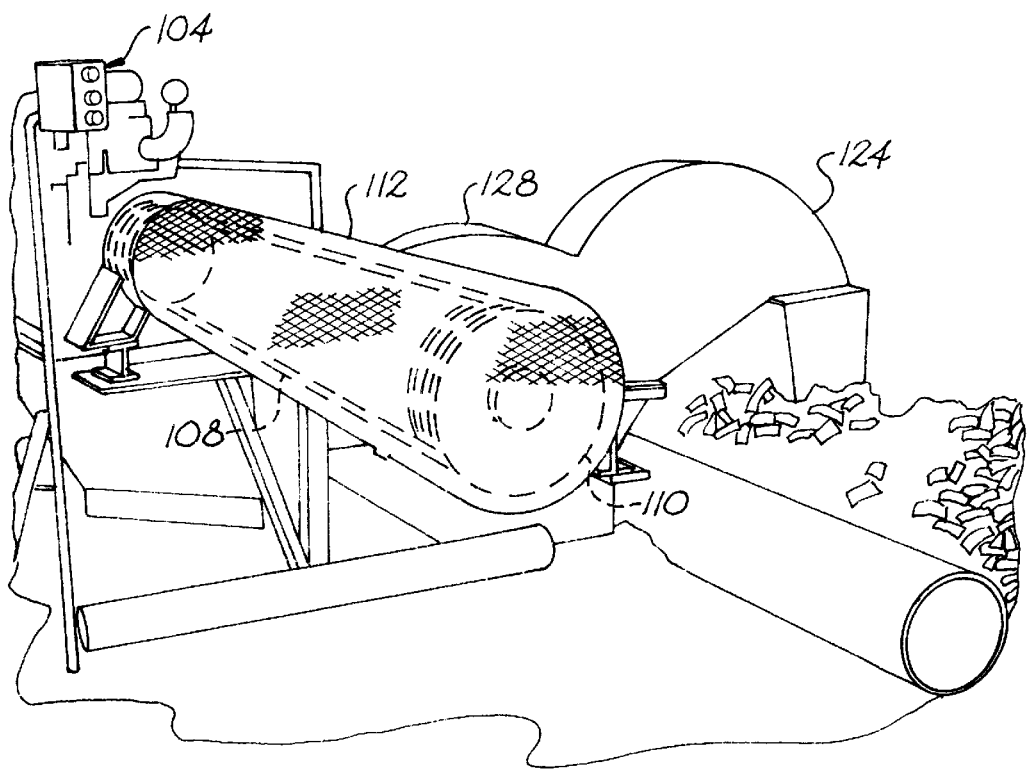
FIG. 2 is a is a perspective photographic view of the plastic chipping machine shown in FIG. 1.

Turning to FIG. 2 of the present invention, it can be seen that a power source, such as a 450 horsepower diesel engine 104, is provided for powering rotation of the chipper disc 102 (FIGS. 5 and 6) within chipper 100. Engine 104 drives the chipper disc via a belt 108 connected to a driving sheave or pulley 110 carried within shroud 112.

The chipper 100 includes a modified intake chute 114 having an enlarged inlet end 118 for receiving whole pipe P or longitudinal segments of pipe up to 23 inches in diameter or in width dimension. There is no real limitation as the to length dimension of the pipe or pipe segments, or other polymeric articles, which may be inserted into intake chute 114. Once inside of intake chute 114, the pipe P or other article is carried by a series of rollers 122 (only a several of which are shown for illustrative purposes), which support the pipe P or other article as it is drawn into the chipper blade, or disc 102.

It should be noted that as with the Morbark chipper, the intake chute angle has been maintained with respect to the plane in which chipper blade 102 rotates at an angle approximately a, which is preferably approximately 30°. By disposing intake chute 114 and, consequently, the feed angle of stock being fed to chipper blade 102 at this angle, the shearing of chips from the article induces a pulling force having linear components in the direction of the material being fed, thus causing the material to be automatically drawn into the chipper blade as the chipper blade rotates. This is particularly true in the case of polyethylene pipe and segments.

FIG. 3 illustrates discharge chute 124 connected to the hood 128 around chipper blade 102 and the semi-circular profile of discharge chute 124. Discharge chute 124 defines a large interior portion which allows for a much greater volumetric area through which the chips pass prior to exiting discharge opening 130 of discharge chute 124. By providing this much larger area than would ordinarily be found with discharge chutes of wood chippers, clogging of the plastic chips within the discharge chute 124 is greatly minimized.

Discharge chute 124 includes a generally semi-circular upper wall 132 and two generally flat side walls 134. This arched curvature of wall 132 allows the chips C to follow projectile or parabolic-like motion as they are propelled by disc 102. Chute 124 is large, and is actually taller than hood 128. This gives further volume and elevation through which the chips may fly. Chute 124 is also longer than hood 128 to, again, give further room for chip movement, in order to reduce clogging. Chute 124 also flares outwardly towards opening 130 to further reduce the likelihood of chips C jamming in chute 124. Discharge opening 130 is a generally horizontally disposed square opening and is preferably longer than the diameter dimension of chipper blade 102, and lower wall 138 of discharge chute 124 extends from discharge opening at an angle to the base of chipper 100.

Discharge chute 124 is designed to mate with the discharge opening of the Morbark chipper. However, it is to be noted that the hood 128 of chipper 100 has been significantly modified to allow a much larger exit opening than is the case with the conventional Morbark chipper. As shown in the drawings, discharge chute 124 extends well above the height of the axle 140 of the chipper disc. This is not the case with the Morbark opening, the upper edge of which is generally in line with the center of the chipper disc. Thus, practically speaking, the discharge chute side of the chipper hood has a significantly larger open portion to provide a continuous opening from lower wall 138 of discharge chute 124 to the interface of upper wall 132 of discharge chute 124 and hood 128, notably at 142 in FIGS. 3 and 4. FIG. 4 also shows the angled disposition of intake chute with respect to base 150 of chipper 100.

Figure 5:
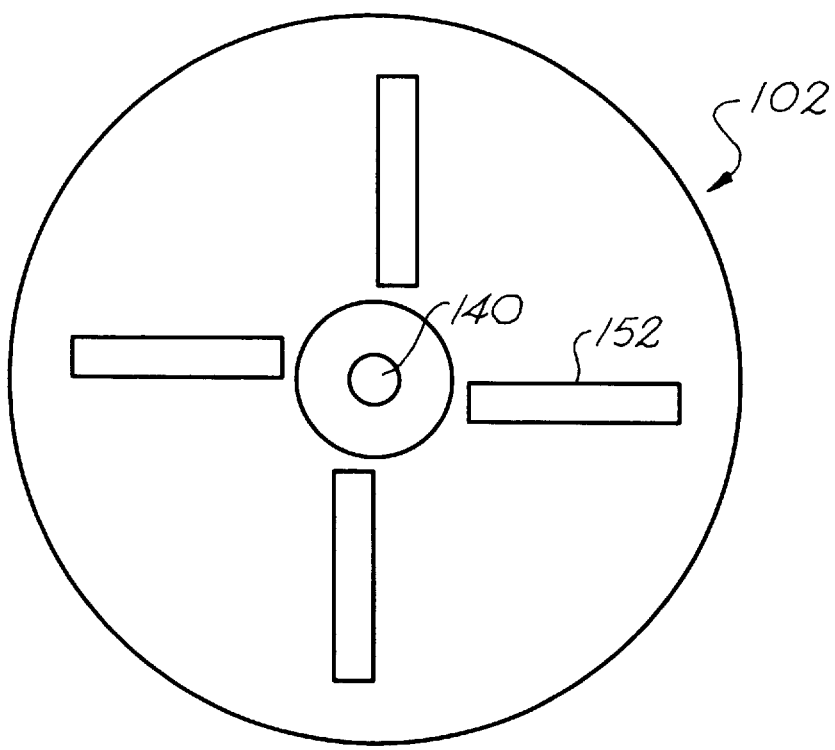
FIG. 5 is a schematic front elevational view of a chipping blade constructed in accordance with the present invention, having four blade pockets.

FIG. 5 illustrates four blade openings, or pockets, 152 provided in chipper disc, or impeller, 102 of chipper 100. Chipper disc 102 is carried for rotation on axle 140 (FIG. 6), axle 154 being connected to pulley 110 for being driven by motor 104.

Blade openings 152 work in connection with cutting blades 170 and a bed knife, such as disclosed in the *Morbark Operators Manual*. The bed knife is identified as knife 30 in the *Morbark Parts Manual*.

Figure 6:
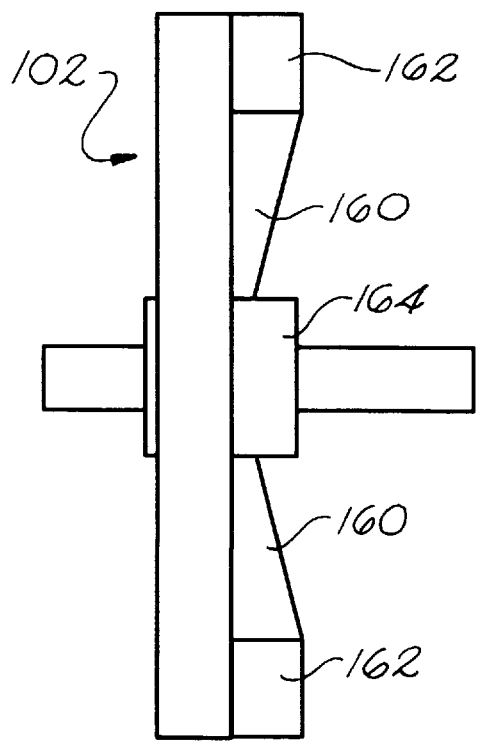
FIG. 6 is a schematic side elevational view of the chipping blade, or impeller, shown in FIG. 5, having paddle extensions.

FIG. 6 illustrates the Morbark chipper disc as modified for the present chipper 100. Tapered-in paddle extensions, generally 160, have been added to each paddle 162 provided on the Morbark chipper disc. Note that while not shown, the chipper disc 102 includes cutting blades, such as blades 30 shown in FIG. 7, on the intake side thereof. These paddle extensions 160 minimize accumulation of polymeric or plastic chips in the region between the paddles 162 and shaft 154 or boss 164, which could lead to jamming of the chipper disc, should such chips build up in hood 128.

It is to be understood that although chipper 100 has been developed based on a Morbark 75-inch chipper, other conventional wood chipping machines could also be likewise converted and made suitable for chipping polymeric pipe and other articles. Further, chipper 100 could be constructed new, without modifying a conventional chipper, by applying the teachings and features discussed above with respect to chipper 100. This would thereby yield a machine different in appearance than that disclosed in the present drawings, but which provides the same functionality in chipping polymeric and other plastic item.

It should also be noted that the chipper 100 could be used to chip wood products, if desired.

In operation, a length of polymeric pipe P or other article is inserted into intake chute 114 to be supported on rollers 122. Once the end of such pipe P or article engages with chipper disc 102, chips are removed from the article, and the article is propelled inwardly due to the angular relationship of chute 114 and chipper disc 102. Chips C removed from the article are propelled outwardly from the area of hood 128 by paddles 162 of chipper disc 102. The chips then fly through discharge chute 124 and outwardly from discharge opening 130. The chips thus discharged are then ready for feeding into a conventional granulator.

While preferred embodiments of the invention have been described using specific terms, such description is for present illustrative purposes only, and it is to be understood that changes and variations to such embodiments, including but not limited to the substitution of equivalent features or parts, and the reversal of various features thereof, may be practiced by those of ordinary skill in the art without departing from the present disclosure and claims.

What is claimed is:

1. A machine for chipping an article, comprising:
    an intake for receiving the article;
    an elongated chipping member for receiving the article from said intake and for cutting chips from the article, said chipping member being rotatable and defining an axis of rotation;
    a motor drivingly connected to said chipping member for selectively rotating said chipping member;
    said chipping member having at least one cutting blade and defining at least one blade opening adjacent said cutting blade;
    at least one paddle associated with said blade opening, said paddle extending radially with respect to said axis of rotation of said cutting member and said paddle having a tapered-in portion tapered inwardly toward said axis of rotation; and
    a discharge chute for receiving the chips cut from the article by the chipping member, said discharge chute defining a discharge opening, and said discharge chute defining a chip path through which the chips travel; said discharge chute defining an arched wall forming a portion of said chip path, and said arched wall being at a higher elevation than both said chipping member and said discharge opening.

2. A machine for chipping an article, comprising: an intake for receiving the article;
    an elongated chipping member for receiving the article from said intake and for cutting chips from the article, said chipping member being rotatable and defining an axis of rotation;
    a motor drivingly connected to said chipping member for selectively rotating said chipping member;
    said chipping member having at least one cutting blade; and
    a discharge chute for receiving the chips cut from the article by the chipping member, said discharge chute defining a discharge opening and a chip path through which the chips travel; said discharge chute defining an upper wall forming a portion of said chip path, and said upper wall being at a higher elevation than both said chipping member and said discharge opening.

3. A machine as defined in claim 2, further comprising at least one paddle connected to said chipping member, said paddle extending radially with respect to said axis of rotation of said chipping member and said paddle having a tapered-in portion tapered inwardly toward said axis of rotation.

4. A machine as defined in claim 3, wherein said paddle includes a generally rectangular portion adjacent to said tapered-in portion.

5. A machine as defined in claim 3, wherein said tapered-in portion of said paddle extends to said axis of rotation of said chipping member.

6. A machine as defined in claim 3, wherein said at least one paddle includes four paddles generally radially equidistantly spaced apart from one another.

7. A machine as defined in claim 2, wherein said chipping member is generally disc-shaped, and wherein said discharge chute includes a generally semi-circular portion having a diameter greater than said chipping member.

8. A machine as defined in claim 2, further comprising said discharge chute including a discharge opening having a length greater than the length of said chipping member.

9. A machine as defined in claim 2, further comprising:
    a housing generally covering said chipping member, said housing defining a first arched portion;
    said discharge chute connected to said housing, said discharge chute defining a second arched portion connected to said first arched portion; and
    said second arched portion being configured for defining a generally parabolic-shaped chip path for chips cut by said chipping member.

10. A machine as defined in claim 2, wherein said chipping member is generally disc-shaped, and further comprising said discharge chute including a discharge opening having a length greater than the diameter of said chipping member.

11. A machine as defined in claim 2, further comprising said discharge chute including a generally semi-circular portion having a diameter greater than said chipping member and defining a chip path volume of generally semi-circular cross-sectional shape.

12. A machine as defined in claim 2, wherein said chipping member is generally disc-shaped.

13. A machine as defined in claim 2, wherein said intake is an elongated chute and approaches said chipping member at an angle of approximately 30 degrees with respect to the plane of rotation of said chipping member.

14. A machine as defined in claim 2, wherein said intake is an elongated chute having a plurality of rollers for supporting and facilitating movement of the article in said intake.

15. A machine for chipping a article, comprising:
    an intake for receiving the article;
    an elongated chipping member for receiving the article from said intake and for cutting chips from the article, said chipping member being rotatable and defining an axis of rotation;
    a motor drivingly connected to said chipping member for selectively rotating said chipping member;
    said chipping member having at least one cutting blade;
    a discharge chute for receiving the chips cut from the article by the chipping member, said discharge chute including a generally semi-circular portion having a diameter greater than said chipping member and defining a chip path volume of generally semi-circular cross-sectional shape; and
    said discharge chute defining a chip discharge opening and a chip path through which chips travel, and said semi-circular portion including an arched wall at a higher elevation than both said chipping member and said discharge opening.

16. A machine for chipping an article, comprising: an intake for receiving the article;
an elongated chipping member for receiving the article from said intake and for cutting chips from the article, said chipping member being rotatable and defining an axis of rotation;
a motor drivingly connected to said chipping member for selectively rotating said chipping member;
said chipping member having at least one cutting blade; and
a discharge chute for receiving the chips cut from the article by the chipping member, said discharge chute defining a discharge opening and a chip path through which the chips travel; said discharge chute defining an arched wall forming a portion of said chip path, and said arched wall being at a higher elevation than both said chipping member and said discharge opening.

17. A machine as defined in claim 16, further comprising said discharge chute including a discharge opening having a length greater than the length of said chipping member.

18. A machine as defined in claim 16, further comprising a housing generally covering said chipping member, said housing defining a first arched portion, said discharge chute defining a second arched portion connected to said first arched portion, and said second arched portion being configured for defining a generally parabolic-shaped chip path for chips cut by said chipping member.

19. A machine as defined in claim 16, wherein said chipping member is generally disc-shaped, and further comprising said discharge chute including a discharge opening having a length greater than the diameter of said chipping member.

20. A machine as defined in claim 16, further comprising a housing generally covering said chipping member, said discharge chute being connected to said housing and defining a discharge opening, and said discharge chute flaring outwardly from where said discharge chute connects to said housing to said discharge opening.

21. A system for providing polymeric chips from a polymeric article, comprising:

a polymeric article;

an intake for receiving said polymeric article;

an elongated chipping member for receiving said polymeric article from said intake and for cutting polymeric chips from said polymeric article, said chipping member being rotatable and defining an axis of rotation;

a motor drivingly connected to said chipping member for selectively rotating said chipping member;

said chipping member having at least one cutting blade and defining at least one blade opening adjacent said cutting blade; and a discharge chute for receiving the chips cut from said polymeric article by the chipping member, said discharge chute defining a discharge opening and a chip path through which the polymeric chips travel; said discharge chute defining an upper wall forming a portion of said chip path, and said upper wall being at a higher elevation than both said chipping member and said discharge opening.

22. A method of chipping a polymeric article, comprising:

providing a polymeric article to be chipped;

providing a chipping machine having an elongated, rotatable chipping member, said chipping member having at least one cutting blade and defining at least one blade opening adjacent said cutting blade;

selectively rotating said chipping member;

placing said polymeric article against said chipping member so that said blade cuts a chip from said polymeric article;

providing a discharge chute for receiving the chips cut from said polymeric article by the chipping member, said discharge chute defining a discharge opening and a chip path through which the polymeric chips travel; said discharge chute defining an upper wall forming a portion of said chip path, and said upper wall being at a higher elevation than both said chipping member and said discharge opening; and directing the chips cut from said polymeric article through said discharge chute.

\* \* \* \* \*